3,444,103
PREPARATION OF INORGANIC POLYMERS

Keith Dean Maguire, King of Prussia, Pa., assignor to Pennsalt Chemicals Corporation, Philadelphia, Pa., a corporation of Pennsylvania
No Drawing. Filed Aug. 13, 1965, Ser. No. 479,651
Int. Cl. C08g 33/16
U.S. Cl. 260—2                                    7 Claims

ABSTRACT OF THE DISCLOSURE

An improved process for the preparation of inorganic coordination polymers containing a trivalent octahedral metal and phosphinic acid moieties in the backbone which comprises oxidizing a phosphinate salt of a divalent metal having a coordination number of six in its trivalent state while dispersed in water containing a neutral water-miscible organic liquid, and after oxidation is complete diluting the homogeneous solution with water to precipitate the polymer.

---

In the patent application of Anthony J. Saraceno, Ser. No. 382,924, filed July 15, 1964, now U.S. Patent No. 3,275,574 issued Sept. 27, 1966, certain coordination polymers are described and claimed which are completely inorganic in their backbone and which have unexpectedly high temperature stability and are useful for fabricated articles and as coating compositions to be employed under high temperature conditions. Among the polymers described in that application are hydroxy aquo metal phosphinate polymers, having the repeating unit

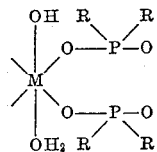

wherein M is a trivalent octahedral metal and the R groups are the same or different organic groups such as alkyl, aryl, alkoxy or aryloxy, preferably a hydrocarbon alkyl or aryl group containing from 1 to 10 carbon atoms. These polymers and copolymers have been prepared heretofore by a two step procedure whereby a divalent metal phosphinate is first prepared, and this material oxidized in the presence of a neutral and a univalent ligand in order to yield the product polymer. The oxidation step has heretofore resulted in a heterogeneous system and as a result the product obtained was somewhat difficult to purify. It has now been found that a more efficient process and a more desirable product is obtained by carrying out the oxidation step in a manner that results in the polymer product being in homogeneous solution. Thus, in accord with the invention, inorganic polymers of the nature described above are prepared by oxidizing a metal phosphinate of empirical formula [R$_2$P(O)O]$_2$M where M is a divalent metal having a coordination number of six in its trivalent state and R is a member of the group consisting of hydrocarbon alkyl and aryl containing from 1 to 10 carbon atoms, said metal phosphinate being dispersed in a solution consisting essentially of water and a neutral water miscible organic solvent, the proportion of water and organic liquid being adjusted to maintain the polymer product in solution, and after said oxidation is completed diluting the solution with water to precipitate the polymer and thereafter separating said polymer from the liquid phase.

In carrying out the process of the invention, the metal phosphinate is preferably of high purity and the technique for obtaining such compounds in high purity is accomplished by reacting an alkali metal salt of the appropriate phosphinic acid with a salt of the divalent metal M (e.g. CrCl$_2$, FeSO$_4$, CrBr$_2$), said reaction being carried out by adding the phosphinic acid salt dissolved in a non-aqueous water-miscible solvent to an aqueous solution of the bivalent metal salt. The water miscible non-aqueous solvent may be any one of a large variety of such types which are well known in the art, as for example liquid heterocyclic compounds such as tetrahydrofuran, dioxane, etc. It is significant that when the reverse addition is used, i.e. the aqueous bivalent salt solution is added to non-aqueous phosphinic acid salt solution, an inferior product results in that it is of lower purity and difficult to purify. The metal phosphinate obtained as described above is hydrated, but the anhydrous material may also be used in the process of invention.

The above steps must, of course, be carried out in the absence of oxygen in order to avoid oxidation of the divalent metal salt to its trivalent state. Standard procedures employing an inert atmosphere of nitrogen or other inert gas may be used.

The divalent metal phosphinate, which is preferably, through not necessarily, obtained by the above procedure, is oxidized to the inorganic polymer in accord with the steps of this invention. The oxidizing agent used in the process may be any conventional oxidant such as oxygen, NO, NO$_2$, hydrogen peroxide, chlorine, bromine, tetracyano mercurate ion, and the like. But in general, and preferably, the oxygen in air will be used. As indicated, the oxidation proceeds with the divalent metal phosphinate in suspension in a mixture of water and a water miscible solvent for the inorganic polymer which is formed. This system must be essentially neutral since the polymer is sensitive to both acids and bases. Generally a pH range of from about 6.5 to about 7.5 should be used and this is accomplished by selecting a water miscible organic liquid which is neutral in character. The neutral liquids which are suitable solvents may be selected from a wide variety of well known organic solvent materials, as for example, ketones, (e.g. acetone, methyl ethyl ketone, etc.,) glycols, glycol ethers (e.g. ethyleneglycol, diethyleneglycoldimethylether), cyclic ethers (such as tetrahydrofuran, dioxane), and miscellaneous other solvents such as dimethyl sulfoxide, dimethylformamide, dimethylacetamide, and the like. The preferred solvent system will comprise water and tetrahydrofuran. As pointed out above the proportions of water and solvent will be such as to maintain the polymer formed in solution as it is formed during the oxidation procedure. It will be understood that this is easily arrived at by simple empirical experimentation whereby the polymer is placed in various mixtures of the solvent system to determine the desirable proportion of each ingredient which will provide a suitable solvent system for the polymer. For example, to make the chromium diphenylphosphinate polymer, a water-tetrahydrofuran system is preferred and it has been found that the preferred proportion of ingredients for this system is about 70% tetrahydrofuran and about 30% water by volume and it is important that the water content should not exceed about 30% by volume.

With the metal phosphinate suspended in the water-solvent system, oxidation is preferably carried out simply by slowly passing a stream of air through the medium, although merely suspending the solid metal phosphinate in the solvent medium and exposing it to air is also suitable. Oxidation is judged complete when the suspension of the metal phosphinate solid in the solvent system disappears completely and the resultant system is a homogeneous solution. This solution is then filtered to remove any foreign solids and the filtrate is poured into a large volume of cold water whereby the inorganic polymer precipitates out. If desired a small amount of sodium chloride may be added to the cold water to aid precipitation of the polymer. The precipitated polymer is then allower to stand for a period of time and filtered off and after washing with water and drying under vacuum the product is obtained in good yield, being on the order of 75% on the phosphinate used.

The inorganic polymer obtained at this point has a low intrinsic viscosity on the order of 0.03 to 0.04 and it may be polymerized further by heat treatment in order to yield a polymer of high molecular weight whose intrinsic viscosity is on the order of 0.4 to 2.0. This is done simply by dissolving the polymer obtained by the process of this invention in a solvent such as chloroform and heating it in a sealed container at about 55° C. for a period of time, generally several days. During this time the molecular weight increases as the material polymerized further and a more desirable, much more useful polymer is thus obtained.

The metal phosphinates which will be used in the process of the invention will be those where the metal is a member selected from the group consisting of chromium, iron, ruthenum, europium, and ytterbium and of these chromium will be preferred. As already indicated the metal phosphinates will be derived from phosinic acids having the structure $R_2P(O)OH$ where the R groups are defined above and are preferably hydrocarbon alkyl or aryl containing from 1 to 10 carbon atoms and these groups will be for example methyl, ethyl, tertiary-butyl, octyl, phenyl, tolyl, xylyl, naphthyl, and the like. It will also be understood that copolymers may be made by using a mixture of phosphinic acids where either the R groups are different, the metals are different, or both R groups and metals are different.

The advantages of the process of the invention are many. For example, the polymeric product obtained is quite pure and may be isolated and purified further without difficulty. As a result of the high purity the polymer has improved properties particularly in that it has more uniform solubility in organic solvents and does not appear to form gels. In order to illustrate the operation of the invention, the following examples are given:

Example 1

Chromium (II) chloride solution was prepared by allowing a mixture of 25 ml. of aqueous hydrochloric acid solution (conc. 2 M) and 25 ml. of an aqueous solution of green chromium (III) chloride (conc. 1 M i.e. ca. 266.7 g. green chromium (III) chloride [1] per liter) to pass slowly through a column of electrolytic grade chromium metal (99.8% Cr min., Fe less than 0.02%) which was heated to 80° C. The $CrCl_2$ solution effluent from this column was collected in a flask from which all air (oxygen) had been previously displaced by purging the apparatus with oxygen free nitrogen. A solution of 24.7 g. of sodium diphenylphosphinate dissolved in 1000 ml. of methanol (pH~6-6.5)

was added slowly to the $CrCl_2$ solution while the whole reaction mixture was stirred and the $N_2$ atmosphere maintained. The addition was made over a period of 1 hr., and during this time a pale grey blue precipitate formed which slowly became bright pink. When the addition of the methanol solution of the sodium diphenylphosphinate was approximately 90% completed, the addition was halted and the reaction mixture examined visually to ensure that the pale blue color characteristic of excess chromium (II) chloride persisted. The addition was then completed at such a rate that chromium (II) was always in excess in order to avoid coprecipitation of phosphinate with the chromium (II) diphenylphosphinate. This should be avoided since it is virtually impossible to remove the excess phosphinate by washing. The pink precipitate was then allowed to settle. The precipitate was filtered off under an atmosphere of nitrogen and washed on the filter with a mixture of 50% $H_2O$ and 50% methanol until the washings were free from chloride. (4–6 washings with 250 ml. portions were sufficient.)

The product was transferred to a flask containing a mixture of 700 ml. tetrahydrofuran (THF) and 300 ml. $H_2O$. (Part of the THF/$H_2O$ mixture was used to aid the transfer process.) The suspension was cooled in an ice bath and the suspension stirred while a slow stream of air was passed through it. After approximately 1.5 hr. the suspension had become a clear bright green solution. This solution was filtered and the filtrate poured into approximately 5 liters of cold water. Stirring and the addition of about 7 g. of sodium chloride, caused precipitation of a pale blue-green solid. After standing overnight the solid was filtered off, washed with water, and dried in a vacuum oven at 65° C. Polymer yield was 18.7 g. of blue green solid which corresponds to 72% based upon diphenylphosphinate used.

Calculated for $[Cr(H_2O)(OH)(OP(C_6H_5)_2O)_2]_x$: C, 55.3; H, 4.48; P, 11.89; Cr, 9.98. Found: C, 55.9; H, 4.57; P, 12.16; Cr, 10.00.

$[\eta]_{30°}^{CHCl_3} \sim 0.04$ (range 0.033–0.044)

Visible spectrum of 1% w./v. soln. in $CHCl_3$ shows *two* distinct peaks of approximately equal intensity at about 625 mμ and 420 mμ. The polymer was completely soluble in acetone, dioxane, benzene, tetrahydrofuran, chloroform, methylene chloride and bis(2-methoxy)ethane.

Example 2

Example 1 was repeated except that the chromous chloride was replaced by $FeCl_2$. The corresponding iron polymer of structure $[Fe(H_2O)(OH)(OP(C_6H_5)_2O)_2]_x$ was obtained. This product was soluble in benzene and chloroform and has an infrared spectrum identical to the chromium polymer of Example 1.

POLYMERIZATION TO HIGHER MOLECULAR WEIGHT

Example 3

Solutions of the polymer of Example 1 (1% in $CHCl_3$) were heated in sealed containers to about 55° C. for 4–10 days. During this time the molecular weight increased (as indicated by increase of $[\eta]$ from 0.04 to approximately 0.5), as the material polymerized further.

Example 4

A solution of the intermediate polymer of Example 1 at concentrations of 1.0, 2.5, 5.0% w./v. in benzene in sealed containers were heated to about 55° for 2 days during which time polymerization took place as indicated by the change of $[\eta]$ from 0.04 to 0.39, 0.39, 0.41 respectively.

Example 5

$CrCl_2$ was prepared as described in Example 1 and to it a solution of 17.5 g. of sodium salt of phenylmethylphosphinic acid dissolved in a mixture of 150 ml. $H_2O$ and 500 ml. THF was added slowly with constant stirring. A blue precipitate formed which was filtered off and washed in the absence of air with 3–50 ml. portion of THF. The product was suspended in 1 liter of 70% THF–30% $H_2O$ and oxidized by a slow stream of air passing into the liquid. The product was a bright green solution. The polymer was precipitated by pouring the solution into a large excess of ice water. The product was filtered, washed with water and dried at 65° C. in a vacuum oven. The product is completely soluble in THF, $CHCl_3$, and benzene.

Example 6

$CrCl_2$ solution was prepared as in accord with Example 1 and to it was added with stirring a solution containing

---

[1] Commonly designated green chromic chloride $CrCl_3 \cdot 6H_2O$ which is in fact composed mainly of $[Cr(H_2O)_4Cl_2]Cl \cdot 2H_2O$.

32.8 g. of the sodium salt of dioctylphosphinic acid dissolved in 1 liter of methanol. Blue hydrated $$Cr[(C_8H_{17})_2P(O)O]_2$$

precipitated. The blue product was filtered off and washed anaerobically five times with 50 ml. portions of 50:50 methanol $H_2O$. The blue solid was oxidized by suspending it in a mixture of 900 ml. of bis(2-methoxy)ethyl ether and 100 ml. of $H_2O$. The product is a thick green solution from which the polymer was precipitated by pouring the solution into a large excess of water. The product was filtered off washed with water and dried under vacuum at 65° C.

As seen from the above examples, the polymers produced by the method of the invention are very soluble in numerous solvents. Furthermore, their solutions do not gel on standing. For example, chloroform solutions containing as high as 5% by weight of the polymer (e.g. $Cr[(OH)(H_2O)(OP(C_6H_5)_2O)_2]_x$ held at 55° C. for 10 days show no evidence of gelation.

It will be understood that numerous changes and variations may be made from the above description and examples without departing from the spirit and scope of the invention.

I claim:
1. The process of preparing an inorganic polymer which comprises oxidizing a metal phosphinate salt of structure $[R_2P(O)O]_2M$ where M is a divalent metal having a coordination number of six in its trivalent state selected from the group consisting of chromium, iron, ruthenium, europium, and ytterbium, and R is a member of the group consisting of hydrocarbon alkyl, and aryl containing from 1 to 10 carbon atoms, said metal phosphinate being dispersed in a solution mixture consisting essentially of water and a neutral, water-miscible ether, the proportion of water and ether being adjusted to maintain the polymer formed in solution, and after said oxidation is completed, diluting the solution with water to precipitate the polymer and thereafter separating said solid polymer from the liquid phase.

2. The process of preparing an inorganic polymer which comprises oxidizing a chromous phosphinate of formula $[R_2P(O)O]_2Cr$ where R is a member of the group consisting of hydrocarbon alkyl and aryl containing from 1 to 10 carbon atoms, said chromous phosphinate being dispersed in a solution mixture consisting essentially of water and a neutral, water-miscible ether, the proportion of water and ether being adjusted to maintain the polymer formed in solution, and after said oxidation is completed, diluting the solution with water to precipitate the polymer and thereafter separating said polymer from the liquid phase.

3. The process of claim 2 wherein the neutral water-miscible ether is tetrahydrofuran.

4. The process of claim 2 wherein the phosphinate salt is chromous diphenylphosphinate and the neutral water-miscible ether is tetrahydrofuran.

5. The process of claim 2 wherein the phosphinate salt is chromous phenylmethylphosphinate and the neutral water-miscible ether is tetrahydrofuran.

6. The process of claim 2 wherein the phosphinate salt is chromous dioctylphosphinate.

7. The process of claim 2 wherein the phosphinate salt is chromous dioctylphosphinate and the ether is bis(2-methoxy)ethyl ether.

References Cited

UNITED STATES PATENTS

| 3,197,436 | 7/1965 | Block et al. | 260—2 |
| 3,275,574 | 9/1966 | Saraceno | 260—2 |

SAMUEL H. BLECH, *Primary Examiner.*

U.S. Cl. X.R.

260—30.4, 32.4, 33.2, 33.6, 33.8, 429, 429.2, 438.5, 439